United States Patent [19]
Jeong

[11] Patent Number: 6,005,598
[45] Date of Patent: Dec. 21, 1999

[54] APPARATUS AND METHOD OF TRANSMITTING BROADCAST PROGRAM SELECTION CONTROL SIGNAL AND CONTROLLING SELECTIVE VIEWING OF BROADCAST PROGRAM FOR VIDEO APPLIANCE

[75] Inventor: Seok Hwa Jeong, Kyoungsangbuk-Do, Rep. of Korea

[73] Assignee: LG Electronics, Inc., Seoul, Rep. of Korea

[21] Appl. No.: 08/978,116

[22] Filed: Nov. 25, 1997

[30] Foreign Application Priority Data

Nov. 27, 1996 [KR] Rep. of Korea ................. 96-58267
Nov. 27, 1996 [KR] Rep. of Korea ................. 96-58268

[51] Int. Cl.$^6$ ................................................. H04N 7/10
[52] U.S. Cl. ........................ 348/5.5; 348/9; 348/460; 380/20
[58] Field of Search ................... 348/5.5, 7, 9, 10, 348/12, 13, 460; 380/20, 23

[56] References Cited

U.S. PATENT DOCUMENTS

| 4,605,964 | 8/1986 | Chard | 348/460 |
| 4,888,796 | 12/1989 | Olivo, Jr. | 379/101 |
| 5,371,795 | 12/1994 | Vogel | 380/23 |
| 5,382,983 | 1/1995 | Kwoh | 348/716 |
| 5,485,518 | 1/1996 | Hunter et al. | 380/20 |
| 5,550,575 | 8/1996 | West et al. | 348/5.5 |
| 5,828,402 | 10/1998 | Collings | 348/5.5 |

FOREIGN PATENT DOCUMENTS

| 0112575 A1 | 7/1984 | European Pat. Off. | H04N 7/16 |
| 0777385 A2 | 6/1997 | European Pat. Off. | H04N 7/173 |
| 2209417 | 5/1989 | United Kingdom | H04N 7/16 |
| 2256116 | 11/1992 | United Kingdom | H04N 7/167 |
| 2284914 | 6/1995 | United Kingdom | H04N 7/16 |
| 2290407 | 12/1995 | United Kingdom | G11B 15/02 |

OTHER PUBLICATIONS

Search Report for GB 9725163.1.
Related Patent Applications list for EP 83113100.8 including English language title.

*Primary Examiner*—Victor R. Kostak
*Attorney, Agent, or Firm*—Flehr Hohbach Test Albritton & Herbert

[57] ABSTRACT

An apparatus and method for transmitting a broadcast program selection control signal, and controlling selective viewing of a broadcast program for a video appliance in which a viewing-restriction grade is set for a broadcast program and viewing of the broadcast program is restricted in accordance with the set viewing-restriction grade. According to the apparatus, the viewing-restriction grade of the broadcast program is determined and a control signal corresponding to the determined viewing-restriction grade is transmitted along with the broadcast program signal. In a television receiver, whether to admit the viewing of the received broadcast program is discriminated by comparing the viewing-restriction grade corresponding to the control signal with that predetermined by a user.

6 Claims, 3 Drawing Sheets

| Viewing Grade | Control Signal | | | Discrimination |
|---|---|---|---|---|
| | $S_1$ | $S_2$ | $S_3$ | |
| Children | 0 | X | X | Program for Adults, Juveniles, and Children |
| Juveniles | 0 | 0 | X | Program for Adults and Juveniles |
| Adults | 0 | 0 | 0 | Program for Adults Only |

FIG. 3

APPARATUS AND METHOD OF TRANSMITTING BROADCAST PROGRAM SELECTION CONTROL SIGNAL AND CONTROLLING SELECTIVE VIEWING OF BROADCAST PROGRAM FOR VIDEO APPLIANCE

BACKGROUND OF THE INVENTION

1. Field of the Invention

The present invention relates to an apparatus and method of transmitting a broadcast program selection control signal, and controlling selective viewing of a broadcast program for a video appliance such as a television receiver, whereby viewing-restriction grades are set for broadcast programs and the programs are selectively viewed in accordance with the set viewing-restriction grades.

2. Description of the Related Art

Diverse broadcast programs are produced and infiltrate into modern civilization with the popularity of information and communication. Such broadcast programs are aired for viewing by everyone regardless of their viewing classes.

Particularly, unsound programs pertaining to violence and sexuality, or all kinds of advertising programs harming the viewers—mental health are aired without restriction. Thus, anyone can view those programs through the video appliances under unrestricted conditions.

Currently, no systematic or technical measures are available to prevent children or juveniles from viewing such programs containing unsound contents without restriction. This tends to decay social culture and harm mental health of the children and juveniles.

It is an object of the present invention to solve the above problems, and to provide an apparatus and method for transmitting a broadcast program selection control signal for a video appliance whereby viewing-restriction grades are net for a broadcast program and a control signal for controlling selective viewing of the broadcast program is transmitted along with the broadcast signal, thereby restricting the viewing of the broadcast program in dependence upon the set viewing-restriction grades.

It is another object of the present invention to provide an apparatus for controlling selective viewing of a broadcast program for a video appliance, whereby the broadcast program can be selectively viewed in accordance with the viewing-restriction qrades determined by a broadcast program selection control signal which is received along with the broadcast signal.

To achieve the above objects, in one aspect of the present invention, there is provided an apparatus for transmitting a broadcast program selection control signal for a video appliance, comprising:

a programming and editing section for producing and editing a program to be broadcasted by a broadcasting station;

a program control section for appending the broadcast program selection control signal to the broadcast program produced and edited by the programming and editing section in accordance with predetermined viewing-restriction grades;

a signal synthesizing and modulating section for synthesizing and modulating the broadcast program signal and the control signal outputted from the program control section to be suitable for being transmitted; and a transmitting section for transmitting the modulated broadcast program signal and control signal outputted from the signal synthesizing and modulating section through a transmitting antenna.

In another aspect of the present invention, there is provided a method of transmitting a broadcast program selection control signal for a video appliance, comprising the steps of:

programming and editing a broadcast program;

appending the broadcast program selection control signal to the broadcast program in accordance with predetermined viewing-restriction grades;

synthesizing and modulating the broadcast program signal and the control signal so an to be suited for transmission; and transmitting the modulated broadcast program signal and control signal.

In still another aspect of the present invention, there is provided an apparatus for controlling selective viewing of a broadcast program for a video appliance, comprising:

a receiving section for receiving a modulated broadcast program signal through a receiving antenna;

a control signal receiving section for receiving a broadcast program selection control signal simultaneously transmitted with the modulated broadcast program signal;

a determining section for determining viewing-restriction grades, the determining section including a coding section for qualifying a particular person to determine the viewing-restriction grades, and a viewing grade determining and releasing section for the particular person's determining and releasing of the viewing-restriction grades;

a discriminating section for discriminating the viewing-restriction grade of the received broadcast program by comparing the viewing-restriction grade of the received broadcast program with that determined by the determining section;

a control section for determining whether to admit the viewing of the received broadcast program in accordance with a discrimination result from the discriminating section; and a video/audio output section for outputting the video and audio signals of the broadcast program under the control of the control section.

BRIEF DESCRIPTION OF THE DRAWINGS

The above object, other features and advantages of the present invention will become more apparent by describing the preferred embodiment thereof with reference to the accompanying drawings, in which:

FIG. 3 illustrates a table explaining the viewing-restriction grade determination according to the combination of the control signals according to the present invention.

DETAILED DESCRIPTION OF THE PREFERRED EMBODIMENTS

Figure 1:
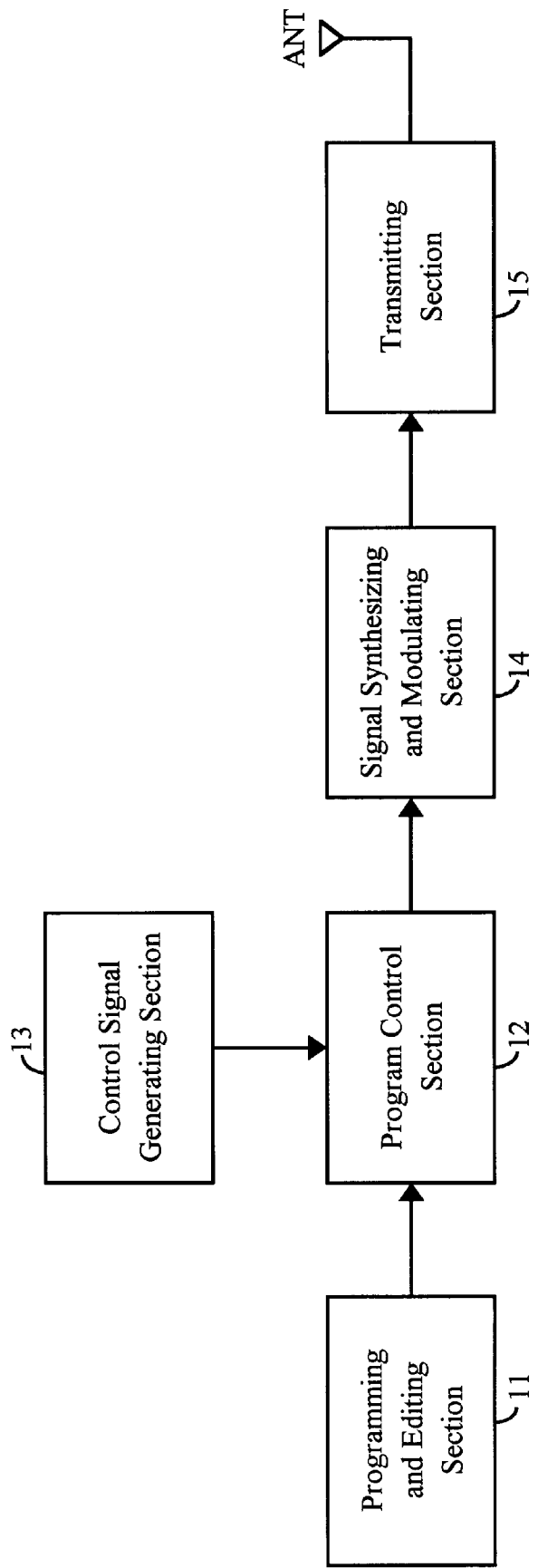
FIG. 1 is a block diagram of the apparatus for transmitting a broadcast program selection control signal for a video appliance according to the present invention.

FIG. 1 shows the construction of the apparatus for transmitting a broadcast program selection control signal for a video appliance according to the present invention.

Referring to FIG. 1, the present apparatus includes a programming and editing section 11 for producing and editing a program to be broadcasted by a broadcasting station, a program control section 12 for inserting or appending the broadcast program selection control signal to the broadcast program produced and edited by the programming and editing section 11 in accordance with predetermined viewing-restriction grades, a control signal generating section 13 for providing to the program control section 12 a program control signal which is composed of a combination of a plurality of control signals, a signal synthesizing and modulating section 14 for synthesizing and modulating the broadcast program signal and the control signal outputted from the program control section 12 to be suitable for being transmitted, and a transmitting section 15 for transmitting the modulated broadcast program signal and control signal outputted from the signal synthesizing and modulating section 14 through a transmitting antenna ANT.

A method of transmitting a broadcast program selection control signal for video appliances according to the present invention, which is performed using the apparatus as constructed above, includes the steps of programming and editing a broadcast program, inserting or appending the broadcast program selection control signal to the broadcast program in accordance with predetermined viewing-restriction grades such as for children, for juveniles, for adults, etc., synthesizing and modulating the broadcast program signal and the control signal so as to be suited for transmission, and transmitting the modulated broadcast program signal and control signal.

At the control signal appending stop, the broadcast program selection control signal may be determined as a multi-stop control signal in consideration of the customs, environments, characteristics, etc., of a concerned country. Accordingly, the viewing-restriction grades are suitably determined by an appropriate viewer or a group of viewer.

The operation of the apparatus according to the present invention will now be explained.

According to the present invention, a control signal corresponding to a viewing-restriction grade is determined in accordance with the characteristic of a broadcast program produced in a broadcasting station, and is then included in the broadcast program signal to be transmitted to the video appliance such as the television receiver. In the television receiver, the viewing-restriction grade has been determined corresponding to the control signal, and accordingly, it is determined whether to admit the viewing of the received broadcast program by comparing the control signal included in the broadcast signal transmitted. from the broadcasting station with the determined value.

In the broadcasting station, when a subject broadcast program is selected, programming and editing are performed through the programming and editing section 11 to complete the program. Thereafter, the program control section 12 determines a corresponding control signal for grading the viewing restriction which is provided from the control signal generating section 13.

Specifically, the program control section 12 append to the broadcast program produced by the programming and editing section 11 a corresponding broadcast program selection control signal in accordance with the viewing grade of the program, for instance, for children, for children and juveniles, and for children, juveniles and adults, as illustrated, in FIG. 3. That is, the program selection control signal appended to the completed program in composed of a combination of first, second, and third control signals S1, S2, and S3. Such control signal may be inserted, for example, in a vertical blanking interval of the video signal.

As shown in the table of FIG. 3, the control signals S1, S2, and S3 are selectively appended to the broadcast program in accordance with the viewing grade thereof such as for children, juveniles, or adults. For instance, only the first control signal S1 in appended to the program for children, while all the first to third control signals S1, S2, and S3 are appended to the program for adults.

After the program selection control signal is appended to the broadcast program by the program control section 12, the broadcast program signal and the control signal are synthesized and modulated through the signal synthesizing and modulating section 14.

The modulated broadcast signal outputted from the signal synthesizing and modulating section 14 in transmitted to the domestic television receiver through the transmission antenna ANT by the transmitting section 15.

In the television receiver, it in determined whether to admit the viewing of the received broadcast signal in accordance with the viewing grades determined in the television receiver. Specifically, if the broadcast program transmitted from the broadcasting station is for adults, the program selection control signal composed of all the control signals S1, S2, and S3 is received. In this case, if the viewing grade determined in the television receiver is for juveniles, the program will be prevented from being viewed or reproduced, while if the determined viewing grade is for adults, the viewing of the program will be possible.

Also, if the broadcast program is for juveniles and thus the received program selection control signal in composed of the first and second control signal S1 and S2, the juveniles will be able to view the program on condition that the viewing grade is determined for juveniles.

As will be explained in detail hereinafter, a user who is authorized adult such as a parent or a guardian may input a code to change or release the determined viewing grade, so that a juvenile or a third person can be subsequently prevented from arbitrary determination of the viewing grade.

Figure 2:
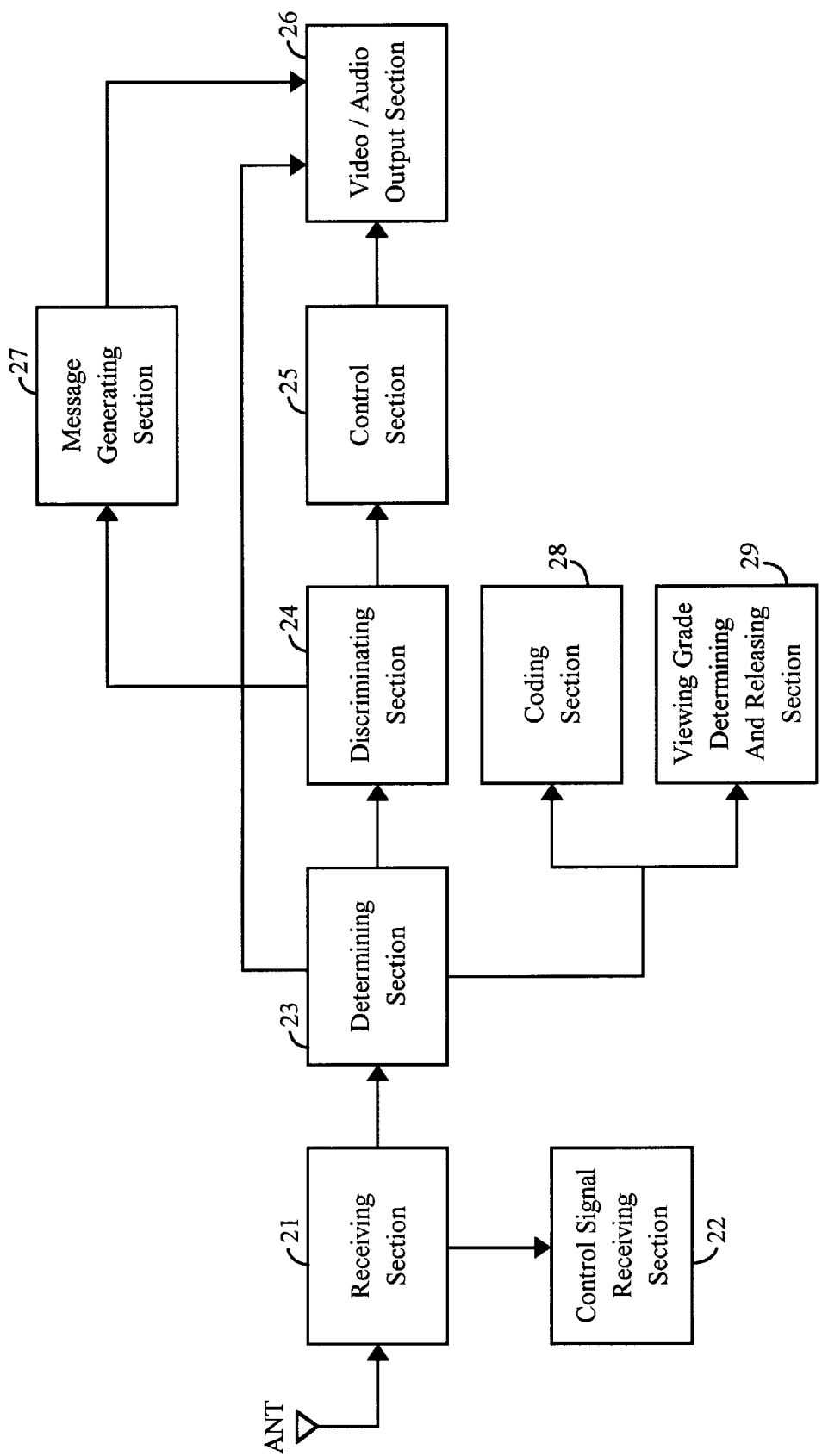
FIG. 2 is a block diagram of the apparatus for controlling selective viewing of a broadcast program for a video appliance according to the present invention.

FIG. 2 shows the construction of the apparatus for controlling selective viewing of a broadcast program for a video appliance.

Referring to FIG. 2, the present apparatus for controlling selective viewing of a broadcast program includes a receiving section 21 for receiving a modulated broadcast program signal through a receiving antenna ANT, a control signal receiving section 22 for receiving a broadcast program selection control signal simultaneously transmitted with the modulated broadcast program signal, a determining section 23 for determining viewing-restriction grades, a discriminating section 24 for discriminating the viewing-restriction grade of the received broadcast program by comparing the viewing-restriction grade of the received broadcast program with that determined by the determining section 23, a control section 25 for determining whether to admit the viewing of the received broadcast program in accordance with a discrimination result from the discriminating section 24, a video/audio output section 26 for outputting the video and audio signals of the broadcast program under the control of the control section 25, and a message generating section 27 for notifying a user of the discrimination result from the discriminating section 24 through the video/audio output section 26.

Preferably, the determining section 23 comprises a coding section 28 for qualifying the user to determine the viewing-restriction grades, and a viewing grade determining and releasing section 29 for the user's determining and releasing of the viewing restriction grade.

The viewing grades of the broadcast program are determined as multi-step grades by the determining section 23 in consideration of the customs, culture, environments, etc. of a concerned country.

When the television receiver is turned on, modulated video and audio signals of a broadcast program are received in the receiving section 21 through a receiving antenna ANT. At this time, control signals S1, S2, and S3, which constitute a program selection control signal for controlling selective viewing of the broadcast program and which are modulated and included in the video and audio signals, are also received in the receiving section, and then recognized by the control signal receiving section 22.

The control signals S1, S2, and S3 transmitted from the broadcasting station in accordance with the table of FIG. 3 are discriminated by the discriminating section 24. That is, the discriminating section 24 discriminates the viewing-restriction grade of the received broadcast program by comparing the control signals with the viewing-restriction grade determined by the determining section 23.

For instance, if the viewing-restriction grade determined by the determining section 23 is for juveniles, only a broadcast program for juveniles can be viewed, while a broadcast program for adults is prevented from viewing.

Thereafter, the control section 25 controls video/audio output section 26 in accordance with the discrimination result from the discriminating section 24. Specifically, in came of the admissible program, the video/audio output section 26 processes and outputs the video and audio signals of the received program under the control of the control section 25 so as for the user to view the program, while in case of the inadmissible program, the control section 25 controls the message generating section 27 to notify the user of the discrimination result through the video/audio output section 26.

The coding section 28 qualifies the user to determine the viewing-restriction grade.

If the viewing-restriction grade determined through the determining section 23 is for juveniles, and the control signals S1, S2, and S3 recognized by the control signa receiving section 22 identify the received broadcast program as for adults, the broadcast program will be unable to be viewed. Thus, the viewing-restriction grade should be redetermined to view the broadcast program.

To redetermine the viewing-restriction grade, the user should input a predetermined authorization code through the coding section 28, so that a viewing-restriction grade changing mode is effected. In this mode, the control section 25 controls the video/audio output section 26 so that the video/audio output section 26 outputs a message notifying the user to input the predetermined code through the video/audio output section 26.

If the user inputs a code, it is compared with the predetermined authorization code in the coding section 28. If the inputted code coincides with the predetermined authorization code, the video/audio output section 26, under the control of the control section 25, outputs a display menu for changing the viewing-restriction grade to be displayed on a screen, so that the user can change the viewing-restriction grade by combining the control signals.

As described above, the user should recognize the predetermined authorization code if the user intends to redetermine or release the viewing-restriction grade.

Meanwhile, if a viewer selects another channel while viewing a broadcast channel program, the control of the selective viewing as described above is performed again with respect to the broadcast program of the selected channel, and the result of the viewing grade discrimination is notified to the viewer through the message generating section 27.

In another embodiment of the present invention, the receiving section is constructed so that it receives and processes the modulated video/audio signal, and the control signal for controlling selective viewing of the program together. In this embodiment, the receiving section can process all the signals received through the antenna.

As described above, according to the present invention, viewing of broadcast programs that might adversely effect children or juveniles can be restricted by transmitting a control signal for determining a viewing-restriction grade with a broadcast program signal in a broadcasting station, and by discriminating whether to admit the viewing of the program by comparing the control signal with a predetermined viewing-restriction grade in a television receiver.

While the present invention has been described and illustrated herein with reference to the preferred embodiment thereof, it will be understood by those skilled in the art that various changes in form and details may be made therein without departing from the spirit and scope of the invention.

What is claimed:

1. An apparatus for controlling selective viewing of a broadcast program for a video appliance, comprising:

a receiving section for receiving a broadcast program signal through a receiving antenna;

a control signal receiving section for receiving a broadcast program selection control signal simultaniously transmitted with the modulation broadcast program signal, the control signal representing a viewing-restriction grade;

a determining section for determining viewing-restriction grades, the determining section including a coding section for qualifying a particular user to determine the viewing-restriction grades, and a viewing grade determining and releasing section for the user's determining and releasing of the viewing-restriction grade;

a discriminating section for discriminating the viewing-restriction grade of the received broadcast program by comparing the viewing-restriction grade of the received broadcast program with that determined by the determining section;

a control section for determining whether admit the viewing of the received broadcast program in accordance with a discrimination result from the discriminating section;

a video/audio output section for outputting the video and audio signals of the broadcast program under the control of the control section;

wherein the program selection control signal received through the control signal receiving section is a multi-step signal which is composed of a plurality of control signals which are combined in accordance with the viewing-restriction grades of the broadcast program; and wherein said pluralty of control signals forming said multi-step signal include first, second, and third control signals that are combined in hierarchical manner according to view restriction grade such that: only said first signal is appended when viewing is permitted for a first restriction grade; said first and second signals are appended when viewing is permitted for a second restriction grade; and all of said first second, and third signals are appended when viewing is permitted for a third restriction grade.

2. The apparatus as claimed in claim 1, wherein said first viewing restriction grade includes children, said second restriction grade includes juveniles, and said third restriction grade includes adults.

3. An apparatus for transmitting a broadcast program selection control signal for a video appliance, wherein the control signal represents a rating of video programs, comprising:

a programming and editing section for producing and editing a program to be broadcast by a broadcasting station;

a program control section for inserting the broadcast program selection control signal to the broadcast program produced and edited by the programming and editing section in accordance with predetermined view-restriction grades;

a signal synthesizing and modulating section for synthesizing and modulating the broadcast program signal and the control signal outputted from the program control section to be suitable for being transmitted; and a transmitting section for transmitting the modulated broadcast program signal and control signal outputted from the signal synthesizing and modulating section through a transmitting antenna wherein said plurality of control signals which are combined include first, second, and third control signals that are combined in hierarchical manner according to viewing restriction grade such that: only said first signal is appended when viewing is permitted for a first restriction grade; said first and second signals are appended when viewing is permitted for a second restriction grade; and all of said first, second, and third signals are appended when viewing is permitted for a third restriction grade.

4. The apparatus as claims in claim 3, wherein said first viewing restriction grade includes children, said second restriction grade includes juveniles, and said third restriction grade includes adults.

5. An apparatus for controlling selective viewing of a broadcast program for a video appliance, comprising:

a receiving section for receiving a modulated broadcast program signal through a receiving antenna;

a control signal receiving section for receiving a broadcast program selection control signal simultaneously transmitted with the modulated broadcast program signal, the control signal representing a viewing-restriction grade;

a determining section for determining viewing-restriction grades, the determining section including a coding section for qualifying a particular user to determine the viewing-restriction grades, and a viewing grade determining and releasing section for the user's determining and releasing of the viewing-restriction grade;

a discriminating section for discriminating the viewing-restriction grade of the received broadcast program by comparing the viewing-restriction grade of the received broadcast program with that determined by the determining section;

a control section for determining whether to admit the viewing of the received broadcast program in accordance with a discrimination result from the discriminating section;

a video/audio output section for outputting the video and audio signals of the broadcast program under the control of the control section;

said program selection control signal received through the control signal receiving section is a multi-step signal which is composed of a plurality of control signals which are combined in accordance with the viewing-restriction grades of the broadcast program;

said control section is operable to compare the viewing-restriction grade represented by the broadcast program selection control signal with that determined by the determining section;

a display control section is provided for displaying through the video-audio output section a code determined through the coding section, and the viewing-restriction grades determined or released through the viewing grade determining and releasing section so that the user identifies the determined or released viewing-restriction grades;

a message generating section for notifying the user of the discrimination result from the discriminating section through the video-audio output section;

said viewing-restriction grades are determined in multiple steps through the determining section in accordance with a particular environment of culture or custom of a concerned country and in compliance with the user's intention;

said plurality of control signals forming said multi-step signal include first, second, and third control signals that are combined in hierarchical manner according to viewing restriction grade such that: only said first signal is appended when viewing is permitted for a first restriction grade; said first and second signals are appended when viewing is permitted for a second restriction grade; and all of said first, second, and third signals are appended when viewing is permitted for a third restriction grade.

6. An apparatus for controlling selective viewing of a broadcast program for a video appliance, comprising:

a receiving section for receiving a modulated broadcast program signal through a receiving antenna;

a control signal receiving section for receiving a broadcast program selection control signal simultaneously transmitted with the modulated broadcast program signal, the control signal representing a viewing-restriction grade;

a determining section for determining viewing-restriction grades, the determining section including a coding section for qualifying a particular user to determine the viewing-restriction grades, and a viewing grade determining and releasing section for the user's determining and releasing of the viewing-restriction grade;

a discriminating section for discriminating the viewing-restriction grade of the received broadcast program by comparing the viewing-restriction grade of the received broadcast program with that determined by the determining section;

a control section for determining whether to admit the viewing of the received broadcast program in accordance with a discrimination result from the discriminating section;

a video/audio output section for outputting the video and audio signals of the broadcast program under the control of the control section;

the program selection control signal received through the control signal receiving section is a multi-step signal which is composed of a plurality of control signals which are combined in accordance with the viewing-restriction grades of the broadcast program;

the viewing-restriction grades are determined in multiple steps through the determining section in accordance with a particular environment of culture or custom of a concerned country and in compliance with the user's intention; and the plurality of control signals forming the multi-step signal include first, second, and third control signals that are combined in hierarchical manner according to viewing restriction grade such that: only the first signal is appended when viewing is permitted for a first restriction grade; the first and second signals are appended when viewing is permitted for a second restriction grade; and all of the first, second, and third signals are appended when viewing is permitted for a third restriction grade.

* * * * *